US012311562B2

(12) United States Patent
Mekhtiche et al.

(10) Patent No.: US 12,311,562 B2
(45) Date of Patent: May 27, 2025

(54) FIREFIGHTER ROBOTIC SYSTEM

(71) Applicant: KING SAUD UNIVERSITY, Riyadh (SA)

(72) Inventors: Mohamed Amine Mekhtiche, Riyadh (SA); Mansour Mohammed Al-Sulaiman, Riyadh (SA); Osama Mansour Alsulaiman, Riyadh (SA); Mohamed Abdelkader Bencherif, Riyadh (SA); Mohammed Mahdi Algabri, Riyadh (SA); Bader Khaled Alkharashi, Riyadh (SA); Jaber Mohammed Alkhaldi, Riyadh (SA); Assim Omar Alsagaby, Riyadh (SA)

(73) Assignee: KING SAUD UNIVERSITY, Riyadh (SA)

( * ) Notice: Subject to any disclaimer, the term of this patent is extended or adjusted under 35 U.S.C. 154(b) by 0 days.

(21) Appl. No.: 18/377,042

(22) Filed: Oct. 5, 2023

(65) Prior Publication Data

US 2025/0114944 A1  Apr. 10, 2025

(51) Int. Cl.
*B25J 9/16* (2006.01)
*A62C 27/00* (2006.01)
*B25J 5/00* (2006.01)

(52) U.S. Cl.
CPC ............. *B25J 9/1697* (2013.01); *B25J 5/007* (2013.01); *B25J 9/162* (2013.01); *A62C 27/00* (2013.01)

(58) Field of Classification Search
CPC ..... B25J 5/00; B25J 5/005; B25J 5/007; B25J 9/1697; B25J 9/162; G05D 1/02–03; A62C 19/00; A62C 27/00; A62C 3/025; A62C 8/005; A62C 13/00–78; A62C 37/00–50
See application file for complete search history.

(56) References Cited

U.S. PATENT DOCUMENTS

| 2023/0288933 A1* | 9/2023 | Maggiore | G06T 7/73 |
| | | | 701/2 |
| 2023/0336942 A1* | 10/2023 | Elam | H04W 4/024 |

FOREIGN PATENT DOCUMENTS

| CN | 208436294 U | | 1/2019 | |
| CN | 110755785 A | | 2/2020 | |
| CN | 112569507 A | * | 3/2021 | ............. A62C 19/00 |
| CN | 112915420 A | * | 6/2021 | |

(Continued)

OTHER PUBLICATIONS

Dharmik et. al.,Fire Extinguisher Robot, International Journal for Research in Applied Science & Engineering Technology, ISSN: 2321-9653, IC Value: 45.98, SJ Impact Factor: 7.538, vol. 10 Issue VI Jun. 2022, www.ijraset.com.
Li et. al., An Indoor Autonomous Inspection and Firefighting Robot Based on Slam and Flame Image Recognition, Fire, vol. 6, Issue 3, https://doi.org/10.3390/fire6030093.

*Primary Examiner* — Spencer D Patton
(74) *Attorney, Agent, or Firm* — Nath, Goldberg & Meyer; Joshua B. Goldberg (57) ABSTRACT

A robotic firefighting system includes: sensors that detect where a fire is located; a base having a movement mechanism; LIDAR and RGB camera positioned on the base for navigation; a fire extinguisher having a nozzle and a fire extinguisher ball launcher positioned on the base to extinguish the fire; a thermal camera to locate the fire; and a robotic arm attached to the nozzle of the fire extinguisher to direct the nozzle toward the fire. The sensors can be remotely located or located on the base.

18 Claims, 9 Drawing Sheets

(56) References Cited

FOREIGN PATENT DOCUMENTS

| CN | 113413564 | A | | 9/2021 |
|---|---|---|---|---|
| CN | 215995395 | U | | 3/2022 |
| CN | 115909647 | A | | 4/2023 |
| EP | 4154946 | A1 | * | 3/2023 |
| WO | 2021115343 | A1 | | 6/2021 |

* cited by examiner

FIREFIGHTER ROBOTIC SYSTEM

BACKGROUND

1. Field

The present disclosure relates to firefighting, and particularly to a robotic system and method for fighting fires.

2. Description of the Related Art

Firefighting is a dangerous task. Many people and firefighters lose their lives fighting fires, especially if the fire becomes big and spreads. Moreover, it takes time for firefighters to arrive at the scene, resulting in the fire getting much bigger and damaging equipment and materials within a building. Regular firefighting systems will fill a building with water, ruining the entire premises, damaging electronic devices such as computers and screens.

SUMMARY

There is a need for a robotic system that can detect a fire in a building at its initial stages using smart fire detectors and extinguish the fire using a mobile robot equipped with a fire extinguisher. The system is based on placing flame and smoke sensors throughout the building and having a mobile robot equipped with a fire extinguisher to extinguish the fire. Some benefits are as follows:

- Detection of fire in a building at its early stages
- Fast extinguishing of the fire from the beginning
- Fully autonomous, hence less human intervention is needed
- Detecting the fire at early stages allows the use of extinguishing materials other than water which will be less harmful to equipment and materials in the building The present system includes two main parts: a firefighter robot and smart smoke or fire sensors. The firefighter robot is equipped with one or more fire extinguishers where the nozzle of the fire extinguisher will be fixed on the end effector of a robotic arm placed on the front of the robot, and the opening and closing of the fire extinguisher will be automatically controlled with a solenoid valve or other actuators. Also, the firefighter robot will be equipped with a thermal camera and a red-green-blue (RGB) camera. The thermal camera will be used to locate the fire, and the RGB camera will be used for remote operation if needed and as another source for locating the fire at its origin. In addition to the fire extinguisher, the firefighter robot will be equipped with a fire extinguisher ball launcher. The fire extinguisher ball launcher will be used to extinguish big fires.

The system is a fully autonomous fire detection and fire extinguishing unit. The system can detect and extinguish the fire from the beginning. A thermal camera locates the fire, and a mobile robot is used to move to the fire location. The system uses a robotic arm to orient the fire extinguisher nozzle to the fire base. The firefighter robot has a two degree of freedom (DOF) arm to reach the fire at any height. Smart smoke or fire sensors detect the fire and send the location of the fire to the firefighter robot. The firefighter robot has a fire extinguisher ball launcher to use when the fire is big. The system can be fully autonomous or remotely operated.

A robotic firefighting system, in one embodiment, includes: sensors that detect where a fire is located; a base having a movement mechanism; Light and Detection ranging (LIDAR) and red, green and blue (RGB) camera positioned on the base for navigation; a fire extinguisher having a nozzle and a fire extinguisher ball launcher positioned on the base to extinguish the fire; and a robotic arm attached to the base; a thermal camera and the nozzle of the fire extinguisher attached to the end effector of the robotic arm to direct the nozzle toward the fire.

In addition to the sensors in the rooms or zones, other sensors can be located in the base. The movement mechanism can be wheels or treads.

The system can further include a controller that communicates with the movement mechanism to move the base and with the robotic arm to move the nozzle. The controller can receive instructions remotely to move the base and robotic arm toward the fire, or can be automated to move the base and robotic arm toward the fire.

A robotic firefighting method, includes: sensing a location of a fire with sensors that detect where a fire is located; moving a base having a moving mechanism, with a controller that sends signals to the moving mechanism to move the base toward the fire; navigating the base to the fire, with the controller, using LIDAR and RGB cameras positioned on the base; discharging fire extinguishing material from a fire extinguisher having a nozzle, and a fire extinguisher ball launcher positioned on the base; and directing the nozzle toward the fire with a robotic arm attached to the nozzle of the fire extinguisher.

The sensors can be remotely located, or located on the base. The movement mechanism can be wheels or treads.

The controller communicates with the movement mechanism to move the base toward the fire and with the robotic arm to direct the nozzle toward the fire. The controller can receive instructions remotely to move the base and robotic arm toward the fire, or the controller can be automated to move the base and robotic arm toward the fire.

These and other features of the present subject matter will become readily apparent upon further review of the following specification.

BRIEF DESCRIPTION OF THE DRAWINGS

Similar reference characters denote corresponding features consistently throughout the attached drawings.

DETAILED DESCRIPTION OF THE PREFERRED EMBODIMENTS

Firefighters face big difficulties in reaching and extinguishing fires quickly. This leads to the fire becoming bigger and more difficult to extinguish. To deal with this, some factories have a department of civil defense to combat any fires, but often there are not enough civil defense agents to have a department in each factory or building.

An innovated firefighter robotic system and method, as disclosed herein, can be installed in buildings and factories to detect and extinguish a fire from the beginning. This innovation provides an immediate fast way to deal with a fire at its early stages, and covers the lack of the skilled civil defense agents needed to be located all the time in each of the factories or buildings. The innovated firefighter robotic system reduces the cost needed to deal with fires and lowers the risk on humans. Moreover, this innovative system lowers the material losses since the system extinguishes the fire from the beginning. Also, unlike ordinary fire extinguishing systems where the room or the zone where the smoke sensor detect a fire is drenched in water or other fire extinguishing material, this innovative system and method locates the exact location of the fire and extinguishes it with minimal damage to equipment or devices in the same room or zone. This results in a reduction of material losses.

Figure 1:
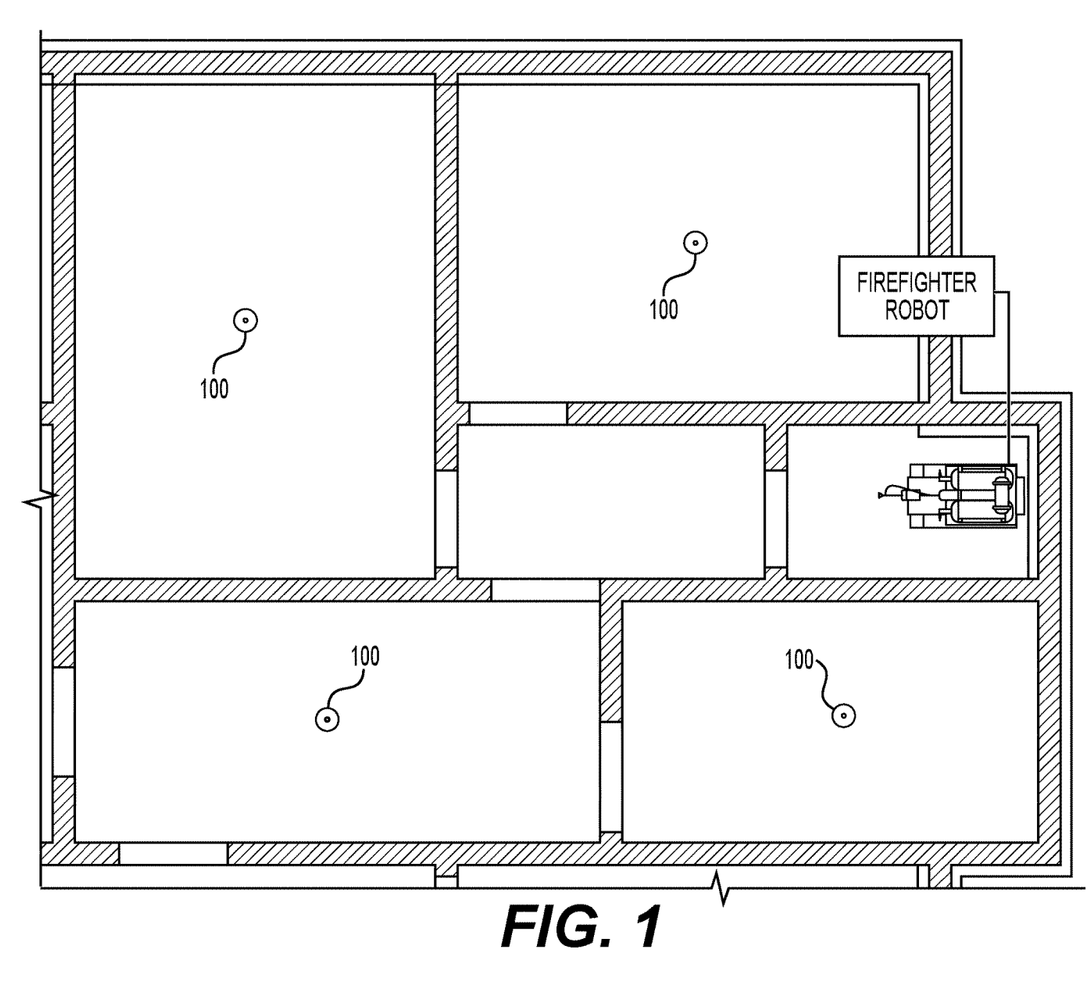
FIG. 1 is an illustration of a robotic firefighter system with remote sensors.

A firefighter robotic system and method can detect a fire in a building at the beginning of a fire and extinguish the fire using a mobile robot equipped with fire extinguishing equipment. The system, as illustrated in FIG. 1, is based on flame and smoke sensors 100 placed all over the building and a mobile robot equipped with fire extinguishing equipment to extinguish the fire where it is located. In other embodiments, the sensors are located on the robot.

The system includes two main parts: a firefighter robot and smart smoke or fire sensors. The firefighter robot is equipped with one or more fire extinguishers where the nozzle of the fire extinguisher is fixed on the end effector of a robotic arm placed on the front of the robot. Opening and closing of the fire extinguisher is automatically controlled by a solenoid valve or other actuators. Also, the firefighter robot is equipped with a thermal camera and an RGB camera. The thermal camera is used to locate the fire and the RGB camera is used for remote operation, if needed, and as another source for locating the fire at its origin. In addition to the fire extinguisher, the firefighter robot is equipped with a fire extinguisher ball launcher. The fire extinguisher launcher is used to help extinguish big fires.

Figure 2:
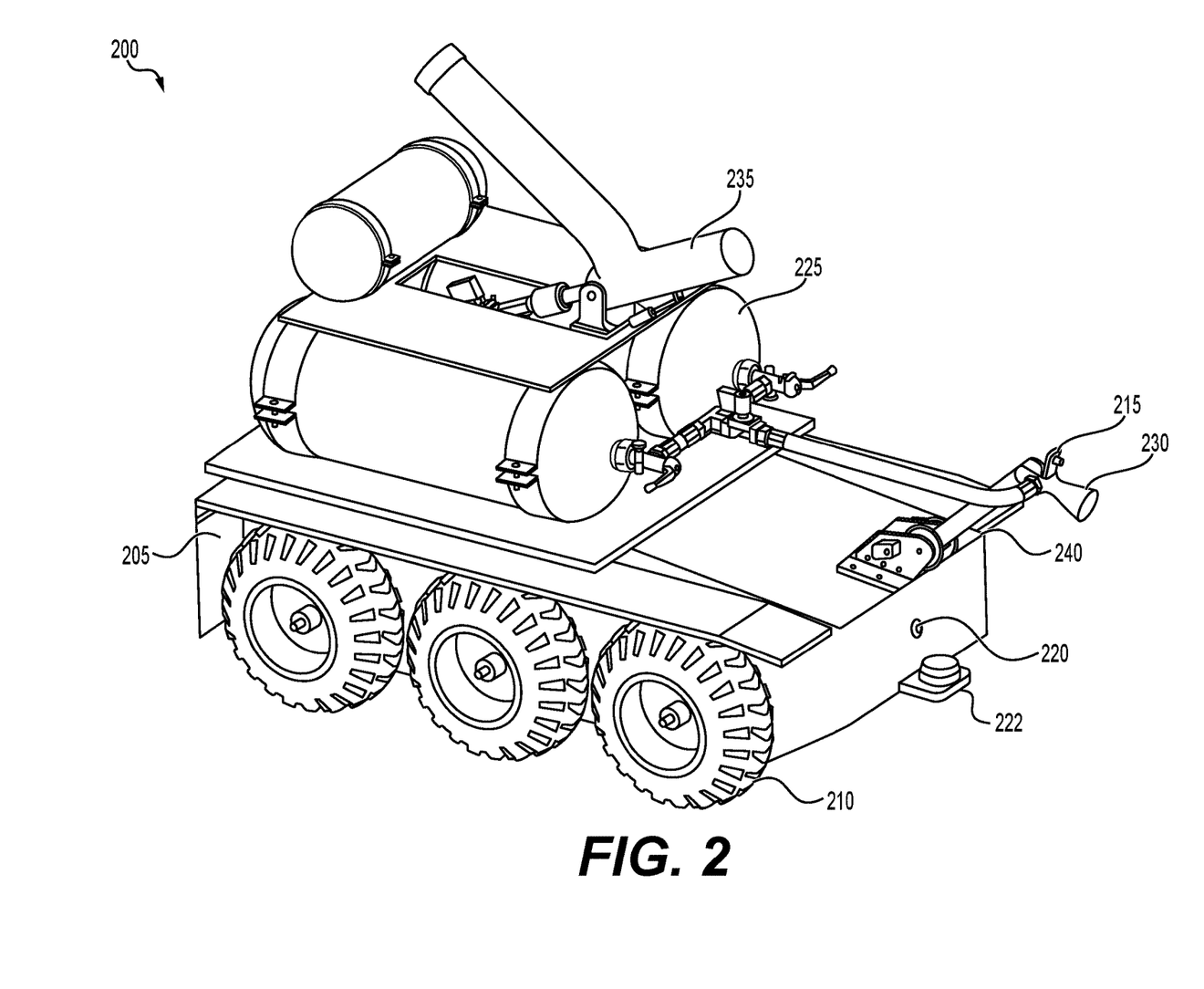
FIG. 2 is an illustration of a robotic firefighting system.

FIG. 2 is an illustration of a robotic firefighting system 200 having a base 205 with a movement mechanism 210. A LIDAR 222 and an RGB camera 220 are positioned on the base 205 for navigation. A fire extinguisher 225 has a nozzle 230 and a fire extinguisher ball launcher 235 positioned on the base 205 to extinguish the fire. A robotic arm 240 is attached to the nozzle 230 of the fire extinguisher 225 to direct the nozzle 230 toward the fire. A thermal camera 215 is attached on the nozzle to locate the fire.

Sensors for detecting the fire can be remotely located or located on the base 205. The movement mechanism 210 can be wheels or treads.

The robotic firefighter system 200 can further include a controller that communicates with the movement mechanism 210 to move the base 205 and with the robotic arm 240 to move the nozzle 230. The controller can be automated to move the base 205 and robotic arm 240 toward the fire, or it can receive instructions remotely to move the base 205 and robotic arm 240 toward the fire.

Figure 3:
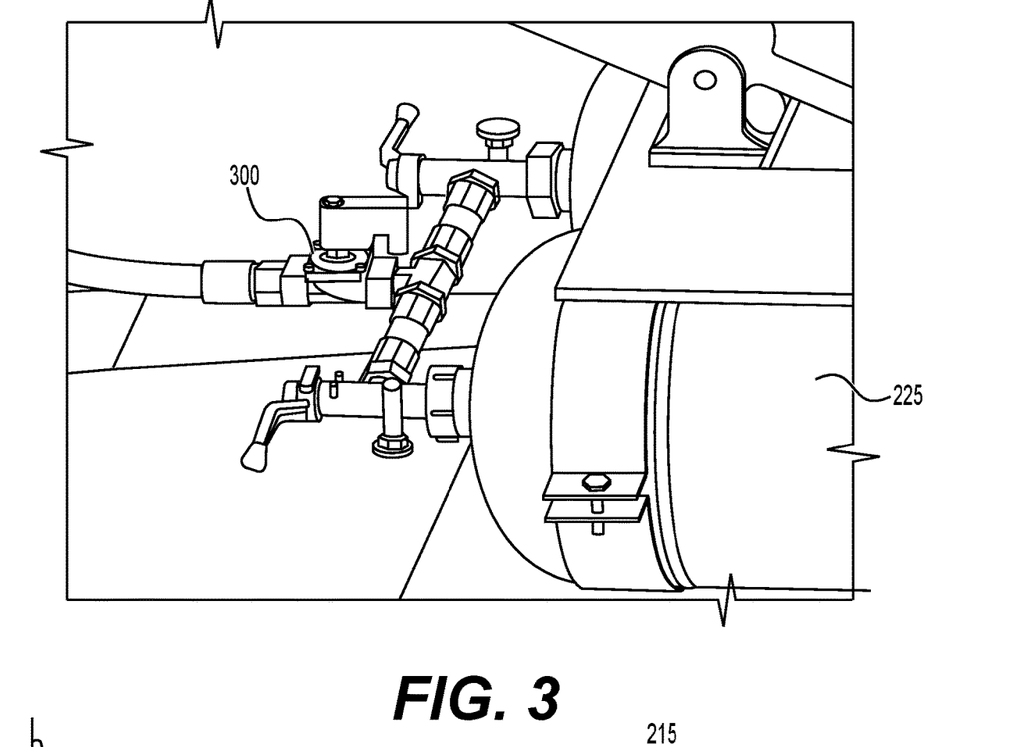
FIG. 3 is an illustration of a solenoid mounted on the output of a fire extinguisher.
Figure 4:
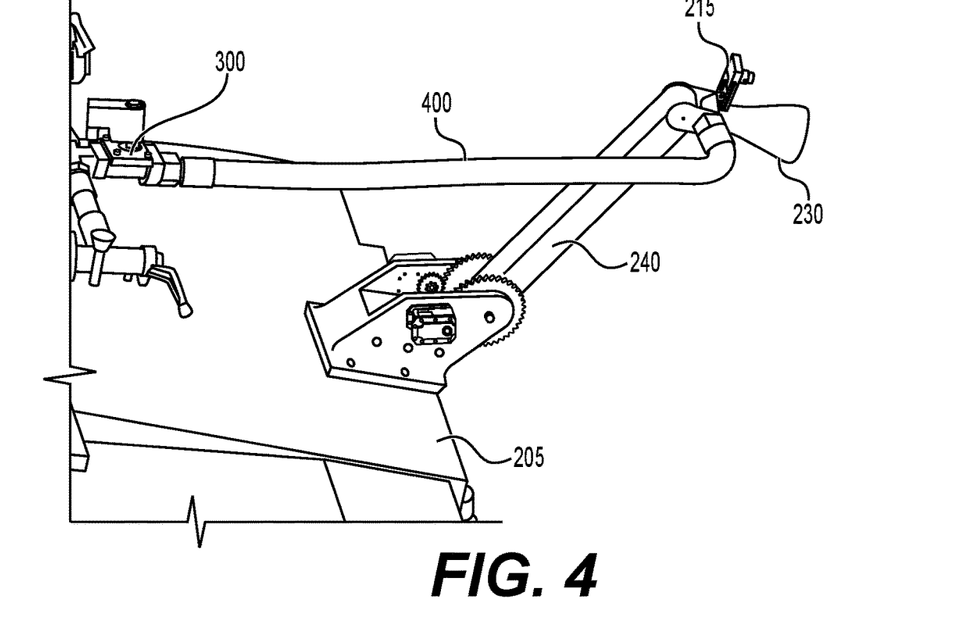
FIG. 4 is an illustration of a robotic arm connected to a nozzle.

The robotic firefighter system 200 can be a mobile robot with a payload of at least 50 Kg, equipped with one or more than one fire extinguisher 225, and a robotic arm 240 with at least two degrees of freedom (DOF). On the output of the fire extinguisher 225, a solenoid valve 300 is mounted to control the opening and closing of the fire extinguisher 225, as shown in FIG. 3. In the front of the robot, a two DOF robotic arm 240 is fixed, and on its end effector, a nozzle 230 and a thermal camera 215 are mounted, as shown in FIG. 4.

A flexible hose 400 is used to connect the output of the solenoid valve 300 to the nozzle 230.

Figure 5:
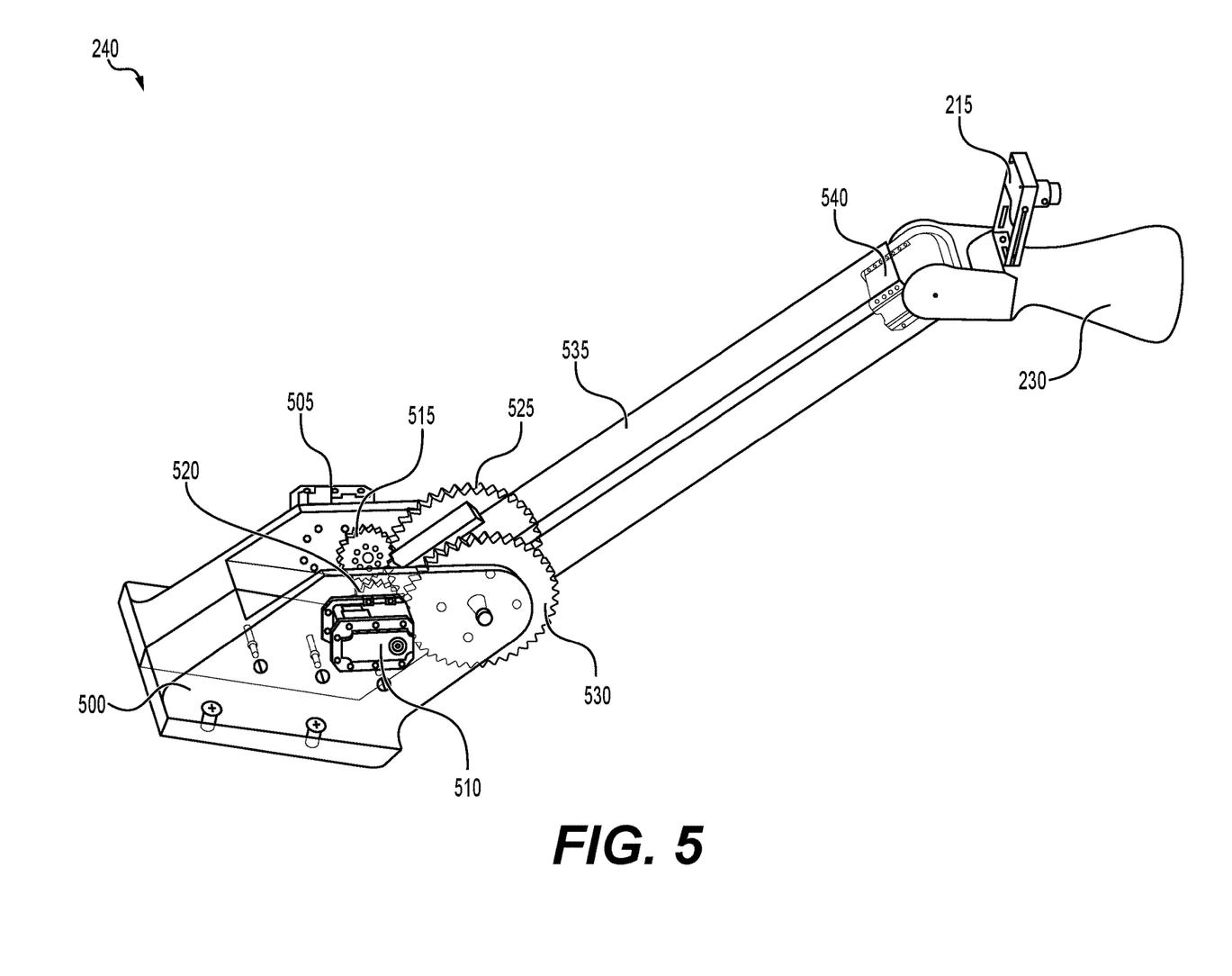
FIG. 5 is an illustration of the robotic arm.

FIG. 5 is an illustration of the robotic arm 240. It includes a base 500 where two synchronized servo motors 505, 510 are mounted. On the shaft of each servo motor 505, 510 a gear 515, 520 of 20 teeth is fixed. In one non-limiting embodiment, each gear 515, 520 has 20 teeth, although any number of teeth can be used. Two other gears 525, 530 are also fixed on the base and engaged with gears 515, 520, so the torque delivered from the servo motors will be tripled. To accomplish this, gears 525, 530 have 60 teeth each, although any number of teeth sufficient to increase the torque can be used. An aluminum bar 535 is fixed between gears 525, 530. The nozzle 230 is attached to the shaft of the aluminum bar 535 along with a servo motor 540. The thermal camera 215 is fixed on the top of the nozzle 230, so that it can be used to locate the fire.

Figure 6:
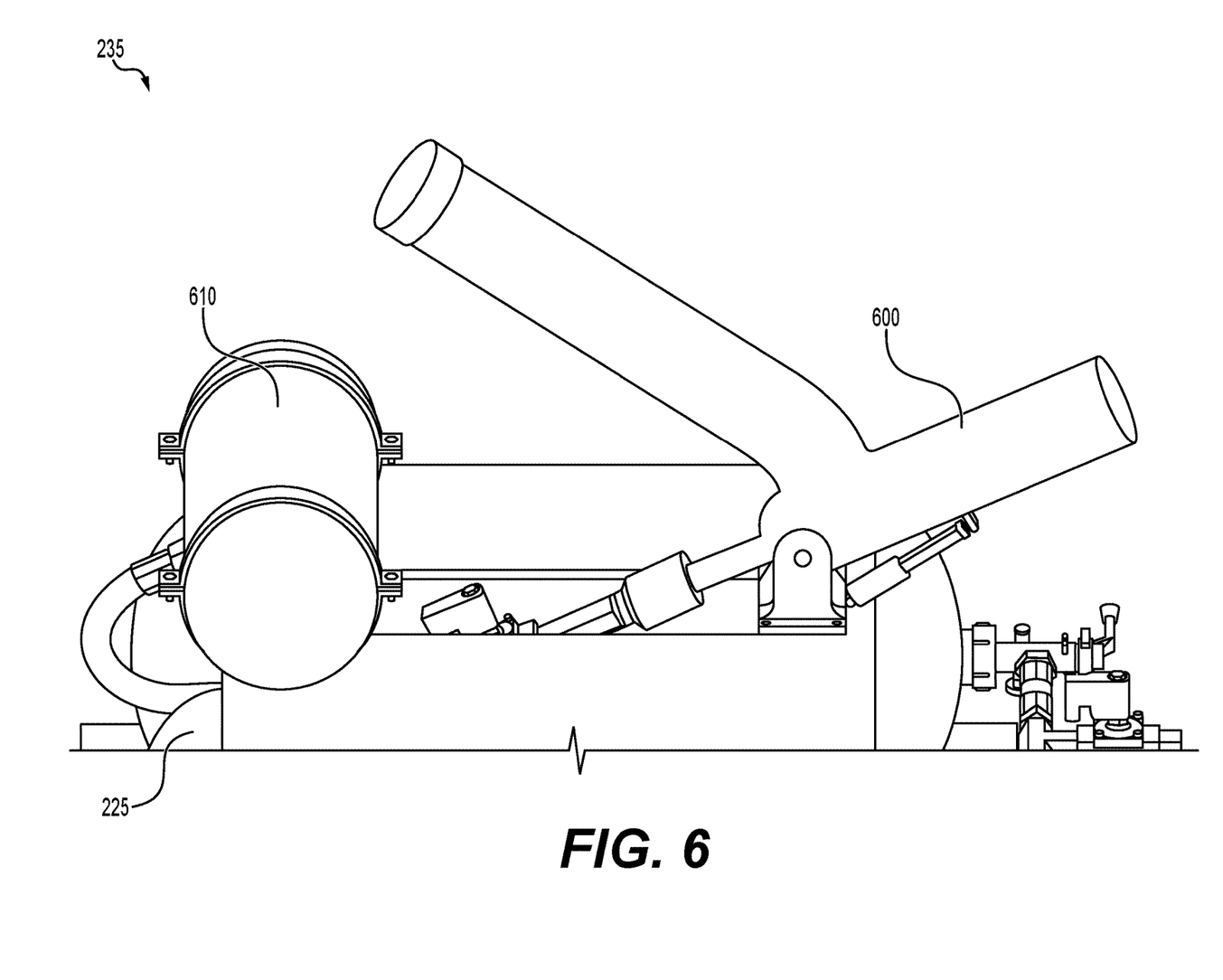
FIG. 6 is an illustration of the fire extinguisher ball launcher mounted on the fire extinguisher.

In addition to the fire extinguishers 225, the firefighter robot system 200 also includes a fire extinguisher ball launcher 235. This launcher 235 is mounted on top of the fire extinguishers 225, and has a ball cannon 600 and high pressure air system 610, as shown in FIG. 6.

Figure 7:
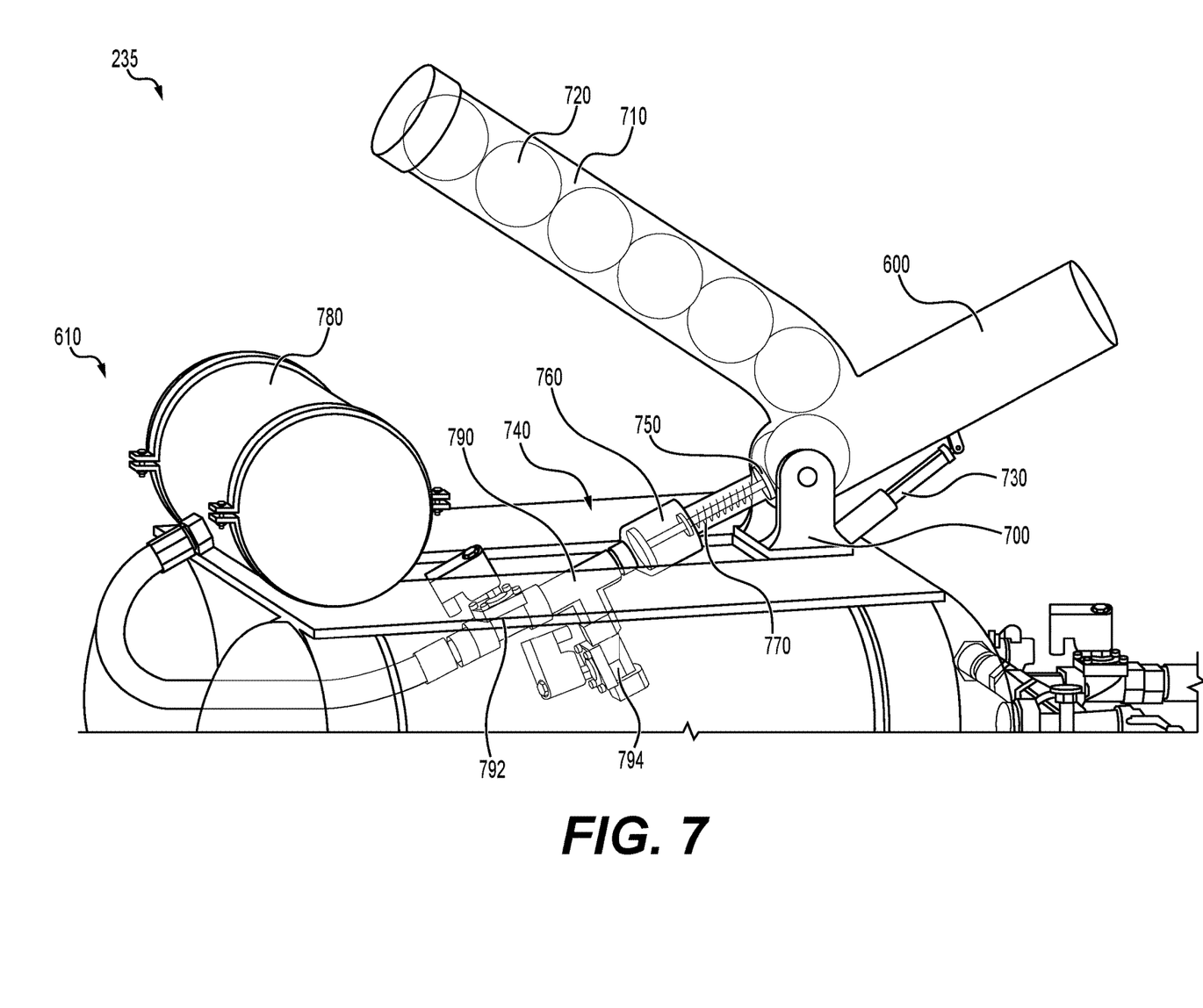
FIG. 7 is a detailed illustration of the fire extinguisher ball launcher.

FIG. 7 is an illustration of the fire extinguisher ball launcher 235. The ball cannon 600 is mounted on a base 700 and has a ball container 710 where the fire extinguisher balls 720 are loaded. The base contains a linear actuator 730 to ensure the up and down movement of the ball cannon 600. The ball cannon 600 has a launch mechanism 740, which includes a piston 750 and a cylinder 760. When high pressure is applied to the cylinder 760, the piston 750 is pushed toward the cannon 600 and shoots the fire extinguisher ball 720. When high pressure is not applied, the piston 750 returns to its initial position by a spring 770. The high pressure is applied by the high pressure air system 610, which includes a high pressure air container 780 and valve system 790. The high pressure air container 780 will feed the valve system 790 with high pressure air, and the valve system 790 controls the air pressure on the launching mechanism cylinder using two solenoid valves 792, 794. When fire extinguisher balls 720 need to be shot from the ball cannon 600, the system opens the first solenoid valve 792 and closes the second solenoid valve 794. This setup feeds the high-pressure air directly to the launch mechanism cylinder 760 and pushes the piston 750 which shoots the fire extinguisher balls 720. When the first solenoid valve 792 is closed, the second solenoid valve 794 is opened to relieve the pressure from the cylinder 760 and let the piston 750 return to its initial position.

Figure 8:
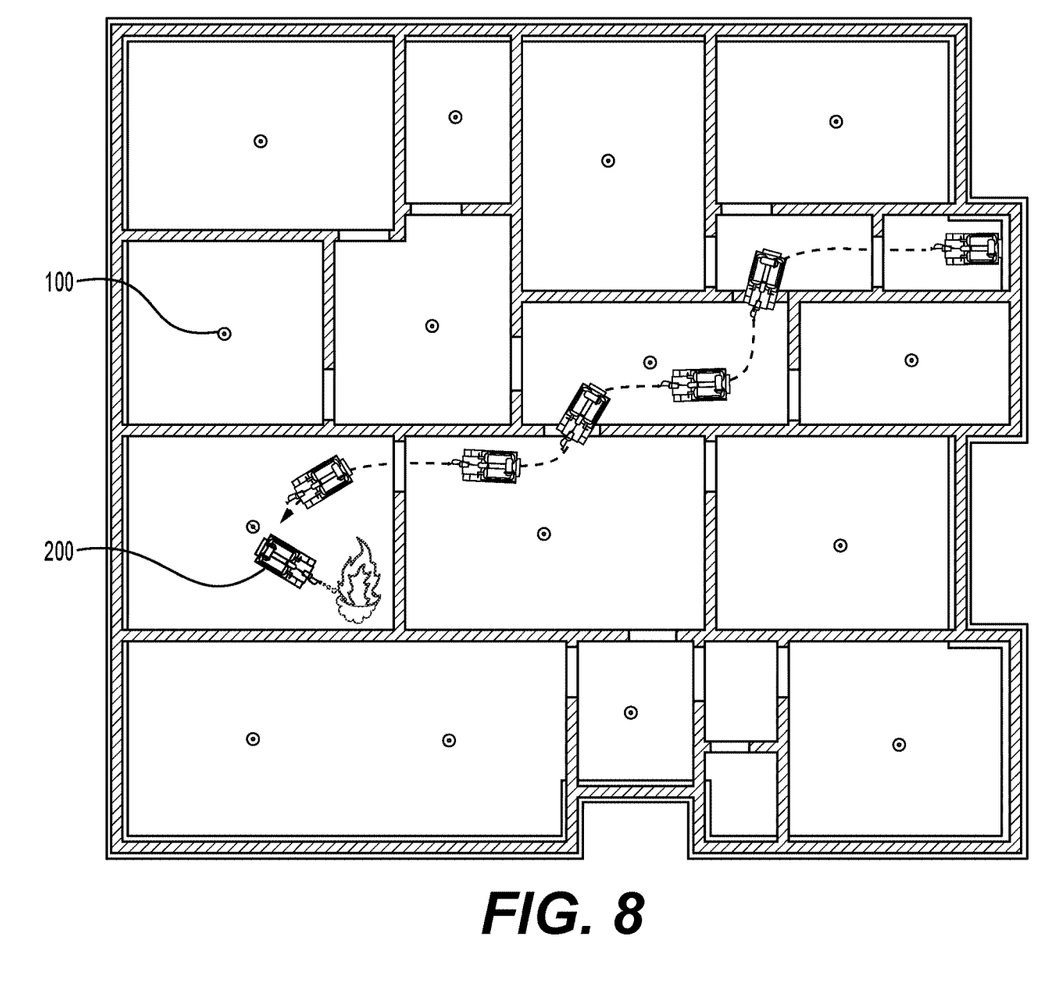
FIG. 8 is an illustration of a robotic firefighter system principle.

When the smart smoke or fire sensor 100 detects a fire in a room or a zone of the building or factory, the smart sensor 100 sends an alarm message to the robot 200. The message contains information about the room or the zone where the fire was detected. When the firefighter robot 200 receives the message, the navigation system on the robot extracts the position of the room or the zone where the fire was detected and creates a path from the current location of the firefighter robot to the position as shown in FIG. 8. The path is created using a preloaded map of the building or factory that is saved on the robot controller. The firefighter robot 200 navigates autonomously to that position. When the firefighter robot 200 reaches the room or the zone where the fire was detected, the firefighter robot 200 activates the thermal camera 215 and starts searching for the fire. When the fire is located using the thermal camera, the robotic arm 240 orients the nozzle 230, fixed on its end effector, to the base of the fire. Finally, when the nozzle 230 is oriented to the base of the fire, the robot controller opens the solenoid valve 300 to spray the extinguishing material on the fire to extinguish it, as shown in FIG. 8. After extinguishing the fire, the firefighter robot 200 searches for other fires in the same room or zone. After that, the firefighter robot 200 navigates back to the charging station.

If the fire detected in the room or zone was big and hard to extinguish using the fire extinguisher, the firefighter robot 200 will not approach the fire and use the fire extinguisher 225, but uses the fire extinguisher ball launcher 235 to shoot the fire extinguisher balls 720 at the big fire instead. The fire extinguisher balls 720 explode and extinguish the big fire or reduce it. Then, if after using the fire extinguisher balls 720, small fires are still in place, the firefighter robot 200 advances to the small fire and uses the fire extinguisher 225 to extinguish the rest of the fires as described before.

In addition to the autonomous operation, the firefighter robot 200 can be remotely operated by an operator. The operator uses a remote controller which includes a tablet where the controller software is installed. The controller software has a 3D view of the robot on the map, and two streaming windows one from the RGB camera 220 and the other from the thermal camera 215. The controller software also has a graphical joystick to control the movement of the robot, two sliders to control the orientation of the fire extinguisher nozzle 230 and the fire extinguisher ball launcher 235, and buttons to control the opening and the closing of the fire extinguisher 225 and to shoot the fire extinguisher balls 720. The operator can switch between the view of the robot and the streaming from the cameras 215,220.

Figure 9:
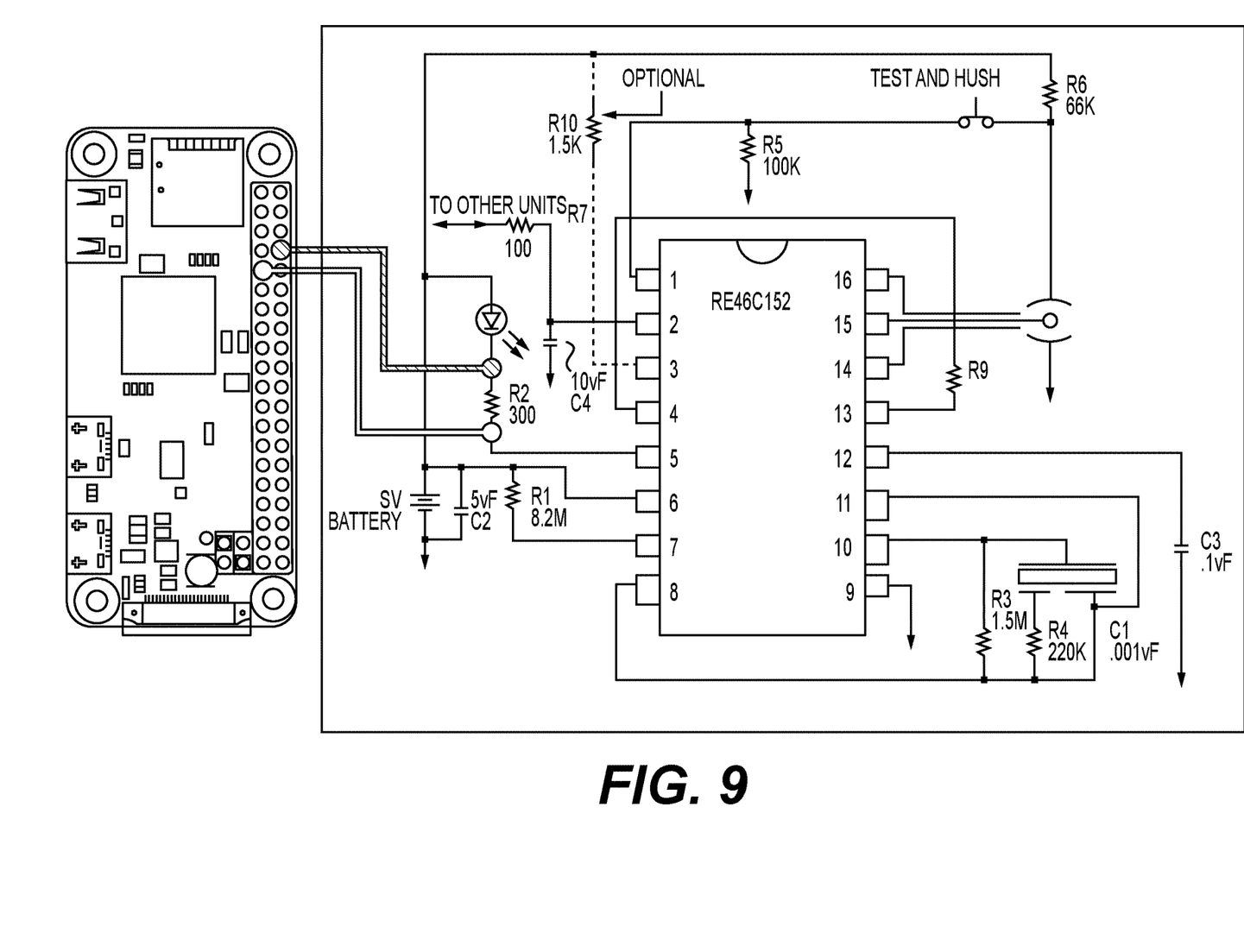
FIG. 9 is an illustration of a smart smoke or fire sensor.

The smart smoke or fire sensor 100 is a sensor that can detect a fire at its beginning and send information about the fire to the firefighter robot. Hence the sensor 100 should have the ability to connect to the firefighter robot 200 through the internet. This smart sensor is achieved by taking any ordinary smoke or fire sensor and connecting it to an IoT device like Arduino or Raspberry pi, as shown in FIG. 9.

Figure 10:
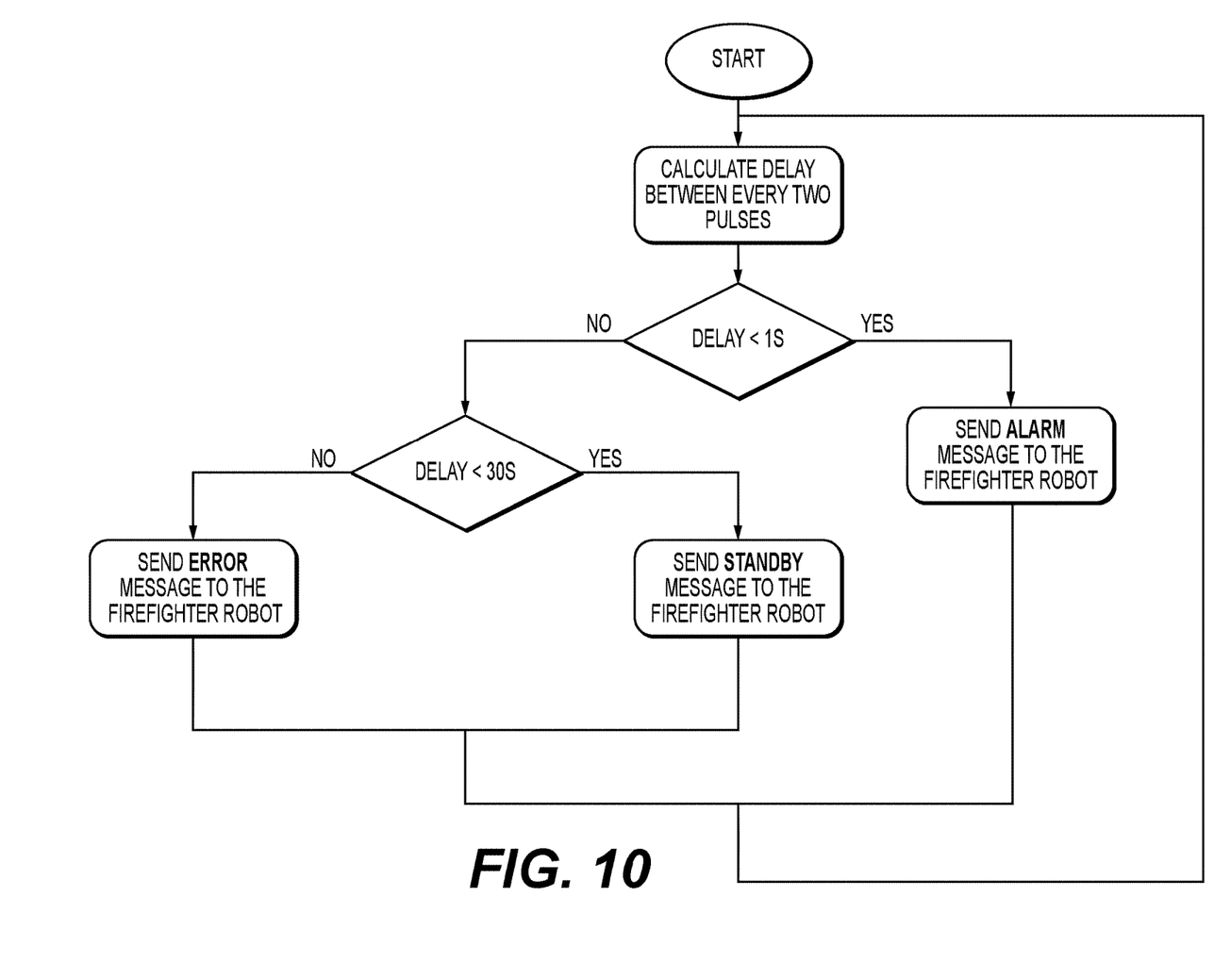
FIG. 10 is a smart sensor flowchart.

The ordinary smoke or fire sensor uses the RE46C152 IC, which is configured to send a pulse every 30 s on its fifth pin when it is on standby, and a pulse every 0.5 s when it is detecting a fire. The IoT device connected to this sensor will be programmed to calculate the time between every two pulses. If the time between the two successive pulses is around 0.5 s then the sensor is detecting a fire and the IoT device will send an alarm message to the firefighter robot. If the time between the two successive pulses is around the 30 s then the sensor is not detecting a fire and the IoT device will send a message to the firefighter robot to let it know that the sensor is working and it is on standby, as shown in the flowchart in FIG. 10. If no pulse is detected for more than the 30 s, the IoT device will send an error message to the firefighter robot to let it know that the sensor attached to the IoT device has a problem (maybe a dead battery), and the robot will send a warning to the operator, so that the operator can fix the problem with the sensor. Also, the firefighter robot should receive a message from all smart smoke or fire sensors every 30 s, to ensure a good connection between the robot and the sensors. Otherwise if one of the sensors didn't send a message, the robot will send a warning to the operator so that the operator can check the sensor and fix it.

Also, the preinstalled fire alarm system can be upgraded to be used with the firefighter robotic system by adding an IoT device to the central unit of the fire alarm system. The IoT device can then send the status of the fire or smoke sensors connected to the central unit to the firefighter robot. If any sensor detects a fire, the IoT device will send the status of this sensor and its position to the firefighter robot. The robot can then navigate to that location and extinguish the fire.

It is to be understood that the firefighter robotic system and method is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A robotic firefighting system, comprising:
smart fire detection sensors that detect where a fire is located;
a base having a movement mechanism;
a smart IoT device attached to a central unit of a preinstalled fire alarm system of a building;
LIDAR and RGB cameras positioned on the base for navigation;
a fire extinguisher having a nozzle and a fire extinguisher ball launcher positioned on top of the base to extinguish the fire;
a robotic arm attached to the base and the nozzle of the fire extinguisher to direct the nozzle toward the fire;
a thermal camera attached on the nozzle to locate the fire and direct the nozzle toward the base of the fire, and
a controller that communicates with the movement mechanism to move the base along a path from a current location of the base to where the fire is located and with the robotic arm to move the nozzle, wherein the path is created using a preloaded map stored in the controller,
wherein status readings of the smart fire detection sensors are extracted from the smart IoT device attached to the central unit of the preinstalled fire alarm system of the building and sent to the controller.

2. The system as recited in claim 1, wherein the smart fire detection sensors are located in each room or area of the building.

3. The system as recited in claim 2, wherein the smart fire detection sensors comprise a smoke detector or fire detector and an IoT device.

4. The system as recited in claim 1, wherein the movement mechanism are wheels.

5. The system as recited in claim 1, wherein the movement mechanism are treads.

6. The system as recited in claim 1, wherein the controller receives instructions remotely to move the base and robotic arm toward the fire.

7. The system as recited in claim 1, wherein the controller is automated to move the base and robotic arm toward the fire.

8. The robotic firefighting system as recited in claim 1, wherein the smart IoT device can be attached to an ordinary preinstalled fire alarm system to convert it to a smart fire detecting system.

9. The robotic firefighting system as recited in claim 1, wherein the smart IoT device extracts status readings from the smart fire detection sensors, and sends the status readings of the smart fire detection sensors to the controller through the internet.

10. The robotic firefighting system as recited in claim 1, wherein the ball launcher launches a ball to extinguish fires that cannot be extinguished by the fire extinguisher attached to the robotic arm.

11. A robotic firefighting method, comprising:
attaching a smart IoT device to a central unit of a preinstalled fire alarm system of a building;
sensing a location of a fire with smart fire detection sensors installed in the building that detect where a fire is located;
extracting status readings of the smart fire detection sensors from the smart IoT device attached to the central unit of the preinstalled fire alarm system of the building and sending the status readings to a controller;
moving a base having a movement mechanism, with the controller, which sends signals to the movement mechanism to move the base toward the fire;
navigating the base to the fire along a path from a current location of the base to the location of the fire, with the controller creating the path using a preloaded map stored in the controller, using LIDAR and RGB cameras positioned on the base;
locating the fire using a thermal camera;
discharging fire extinguishing material from a fire extinguisher having a nozzle and a fire extinguisher ball launcher positioned on top of the base; and
directing the nozzle toward the fire with a robotic arm attached to the nozzle of the fire extinguisher.

12. The method as recited in claim 11, wherein the smart fire detection sensors are located in each room or area of the building.

13. The method as recited in claim 11, the controller determines the statuses of the smart fire detection sensors from one of: a fire has been detected, in standby mode, error message, or sensor disconnected.

14. The method as recited in claim 11, wherein the movement mechanism are wheels.

15. The method as recited in claim 11, wherein the movement mechanism are treads.

16. The method as recited in claim 11, wherein the controller receives instructions remotely to move the base and robotic arm toward the fire.

17. The method as recited in claim 11, wherein the controller is automated to move the base and robotic arm toward the fire.

18. The method as recited in claim 11, wherein the ball launcher launches a ball to extinguish fires that cannot be extinguished by the fire extinguisher attached to the robotic arm.

* * * * *